United States Patent Office 3,412,429
Patented Nov. 26, 1968

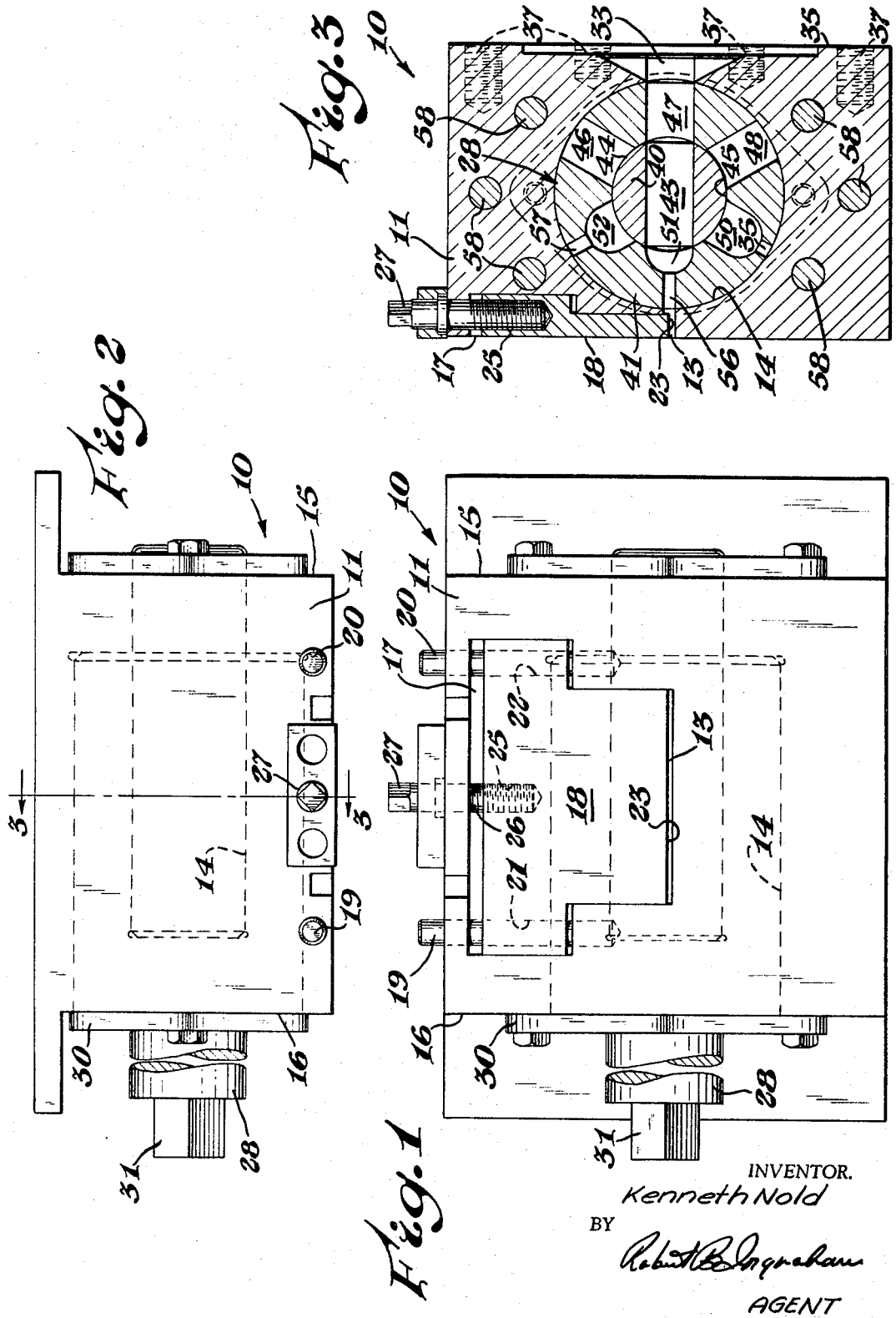

3,412,429
EXTRUSION DIE
Kenneth Nold, Midland, Mich., assignor to The Dow Chemical Company, Midland, Mich., a corporation of Delaware
Filed Nov. 2, 1966, Ser. No. 591,537
6 Claims. (Cl. 18—12)

ABSTRACT OF THE DISCLOSURE

A die is disclosed which has an inner rotor having a plurality of passageways which provide communication between the inlet of the die and the extrusion orifice, each of the passageways has a varying land length and the passages can be selectively positioned by moving the rotor to vary the land length in the stream of plastic material in the extruder. The die is of principle value in the extrusion of foam plastics.

---

This invention relates to an improved extrusion die, and more particularly relates to an improved extrusion die which is readily adjusted for varying conditions.

Oftentimes, synthetic resinous materials are prepared in cellular form by extruding a heat plastified stream of a synthetic resin containing a suitable fluid foaming agent from an orifice into a region of relatively low pressure such as atmospheric pressure whereupon the extruded material foams or swells to form a cellular body. In order to achieve maximum foaming or desired foaming characteristics, it is oftentimes desirable to provide a variable back pressure on the extruder or pressure drop across the die in order to achieve the particularly desirable foam configuation. Oftentimes, the back pressure or pressure drop required varies with the molecular weight of the synthetic resinous material being extruded and adjustment of a die to provide optimum back pressure to provide the desired foam configuration results in the necessity of decreasing the output of an extruder.

It would be particularly advantageous if there were available a die for the extrusion of expandable synthetic resinous materials which would provide means of altering the pressure drop across the die and maintain a generally constant extrusion rate.

It would also be desirable if there were available an improved extrusion die which would permit ready alteration of the pressure drop across the die during extrusion.

It would also be advantageous if there were available an improved extrusion die of simplified construction.

These benefits and other advantages in accordance with the present invention are achieved in an extrusion die, the extrusion die comprising a housing or die body, the housing defining an inlet opening and a discharge opening, an internal cavity disposed within the housing and in full communication with the inlet opening and the outlet opening, a rotor disposed within the cavity, the rotor being rotatably supported therein, the rotor having a plurality of passageways defined therein, the passageways being of varying dimension, each of the passageways adapted to provide communication between the inlet of the housing and the outlet of the housing selectively on rotation of the rotor and the rotor being in peripheral sealing engagement with the portion of the housing defining interior walls of the cavity.

Further features and advantages of the present invention will become more apparent from the following specification taken in connection with the drawings wherein:

FIGURE 1 depicts a front view of a die in accordance with the invention.

FIGURE 2 is a top view of the die of FIGURE 1.

FIGURE 3 is a sectional view of the die of FIGURE 2 taken along the line 3—3.

In FIGURES 1 and 2 there is illustrated a die in accordance with the present invention generaly designated by the reference numeral 10. The die 10 comprises in cooperative combination a housing 11. The housing 11 defines a discharge opening 13 and an internal cavity 14. The housing 11 has a first side 15 and a second side 16. The cavity 14 extends generally transversely through the housing. The housing 11 defines a recess 17. The recess 17 is in communication with the cavity 14 and is generally externally disposed. An adjustable plate 18 is positioned within the recess 17. The plate 18 is supported on a first support 19 and a second support 20. The supports 19 and 20 pass through openings 21 and 22 defined within the plate 18. The plate 18 has an orifice forming edge 23 adjacent the outlet 13. The plate 18 defines an internally threaded aperture 25. The aperture 25 is threadably engaged by an adjusting screw 26 rotatively captive within the housing 11. The screw 26 has an operating means or head 27 disposed externally to the housing. A rotor 28 is disposed within the cavity 14 and extends from the second side of the housing 11. The rotor 28 is maintained in a cavity 14 by a first retaining means 30 secured to the housing or die body 11. A rotor portion 31 extends external to the cavity 14 and provides a means for the rotation of the rotor within the cavity. Remote on the side 15 of the housing 11 is a seal or closure 32 which effectively closes and seals the cavity 14.

In FIGURE 3 there is depicted a sectional view of the die of FIGURES 1 and 2 taken along the line 3—3 of FIGURE 2 wherein a housing inlet passageway 33 is shown formed in a rear or connecting face 35 of the die body 11. The die body 11 defines a plurality of internally threaded apertures 37 in the face 35 particularly adapted to secure the die to an extruder. The rotor 28 comprises a fixed inner portion 40 and a movable outer portion 41. The inner portion 40 has a generally cylindrical body affixed to the seal or closure 32 and defines an elongate slot 43 which extends transversely across the inner portion 40 and has a length generally commensurate with the length of the opening 13. The inner portion 40 has an external generally cylindrical surface 44. The external portion 41 defines an internal cylindrical cavity 45 within which the fixed portion 40 is a sliding fit. The external rotor portion 41 defines a first inlet passageway 46, a second inlet passageway 47 and a third inlet passageway 48 generally radially extending from the axis of the portion 41. The inlet passageways 46, 47 and 48 are of like dimension to the passageway 43 of the fixed rotor portion 40 and on rotation of the external portion 41 provide full communication between the inlet passageway 33 and the centrally disposed portion 43 of the rotor portion 40. The passageways 46, 47 and 48 are generally commensurate in length with the opening 13. The outer portion 41 of the rotor 28 defines passageways 50, 51 and 52 which are diametrically opposed to the passageways 46, 47 and 48, respectively. The passageways 50, 51 and 52 terminate adjacent the outer portion 41 in restrictive or land portions 55, 56 and 57, respectively. Beneficially, in accordance with the invention, the radial length of the land sections 55, 56 and 57 vary to provide three different land lengths which are optionally selected for rotating by the rotating means 31. Optionally, heaters 58 are disposed within the die if desired. Beneficially, electrical cartridge heaters may be used for this purpose.

In operation of the die in accordance with the invention, the die is connected to a source of heat plastified synthetic resinous material such as an extruder by suitable means and heat plastified synthetic resinous material is fed to the passageway 33. As illustrated in FIGURE 3, the heat plastified material flows from the passageway 33 to the passageway 47 of the rotating portion of the rotor through the passageway 43 of the fixed rotor portion 40 into the passageway 51 through the land 46 and is subsequently discharged from the opening 13 defined by the housing and by the adjustable plate 18. Of the three land sections, the land 56 has the largest radial length and therefore provides the minimum pressure drop at the opening 13. By rotating the rotor portion 41 to index the passageway 48 with the passageway 33 and the land portion 57 with the opening 13, an intermediate land length is employed and the back pressure reduced. By indexing the passageway 46 with the inlet 33, minimum land length is obtained and maximum pressure drop at the opening 13 is obtained.

Beneficially, for maximum rigidity, a two part rotor such as is depicted in FIGURE 3 is employed. Alternately, a one piece rotor may be utilized wherein a solid cylinder is slotted to provide full communication between opposed openings. However, for maximum rigidity and ease of operation particularly when utilizing relatively viscous thermoplastic materials, the added rigidity of the two piece construction is desirable.

Employing a die substantially as illustrated in FIGURES 1, 2 and 3, the land length and pressure drop are quickly adjusted during extrusion operation. The arrangement is particularly beneficial when employed with polystyrene which provides adequate lubrication for rotation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:
1. An extrusion die, the extrusion die comprising
a housing, the housing defining
an inlet opening and
an extrusion orifice,
an internal cavity disposed within the housing and in full communication with the inlet opening and the outlet opening,
a rotor disposed within the cavity, the rotor being rotatably supported therein, the rotor defining
a plurality of first passageways therein of like dimension and a plurality of second passageways having a land portion of varying dimension, each of the first passageways having a corresponding and cooperating second passageway to form a passage pair, each of the passage pairs adapted to provide communication between the inlet of the housing and the extrusion orifice of the housing selectively on rotation of the rotor, and the rotor being in peripheral sealing engagement with the portion of the housing defining the interior walls of the cavity.

2. The die of claim 1 wherein passage pairs of the rotor are generally diametrically disposed.

3. The die of claim 1 having a slot-like discharge opening.

4. The die of claim 1 including means external to the housing to selectively position the rotor therein.

5. The die of claim 4 wherein the means comprises an axially affixed shaft.

6. The die of claim 1 wherein the rotor comprises a fixed slotted inner portion and a rotatable outer portion defining a plurality of diametrically opposed first and second passageways.

References Cited

UNITED STATES PATENTS

| | | |
|---|---|---|
| 2,487,910 | 11/1949 | Waddell et al. |
| 2,740,157 | 4/1956 | McCurdy et al. |
| 3,046,602 | 7/1962 | Houvener. |
| 3,050,084 | 8/1962 | Palfey. |
| 3,178,770 | 4/1965 | Willis. |

FOREIGN PATENTS

| | | |
|---|---|---|
| 859,368 | 1952 | Germany. |

WILLIAM J. STEPHENSON, *Primary Examiner.*